US012726759B2

(12) United States Patent
Paulus et al.

(10) Patent No.: US 12,726,759 B2
(45) Date of Patent: Sep. 1, 2026

(54) SPATIAL METADATA DIRECTION HARMONIZATION

(71) Applicant: NOKIA TECHNOLOGIES OY, Espoo (FI)

(72) Inventors: Jouni Kristian Paulus, Hersbruck (DE); Tapani Pihlajakuja, Kellokoski (FI); Lasse Juhani Laaksonen, Tampere (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/332,149

(22) Filed: Sep. 18, 2025

(65) Prior Publication Data

US 2026/0019742 A1 Jan. 15, 2026

Related U.S. Application Data

(63) Continuation of application No. PCT/EP2024/055220, filed on Feb. 29, 2024.

(30) Foreign Application Priority Data

Mar. 31, 2023 (GB) ..................................... 2304791

(51) Int. Cl.
*H04R 1/32* (2006.01)
*G06F 16/683* (2019.01)

(52) U.S. Cl.
CPC ........... *H04R 1/323* (2013.01); *G06F 16/683* (2019.01)

(58) Field of Classification Search
CPC . G10L 19/008; G10L 19/0204; G10L 19/032; G10L 25/03; G10L 25/48;
(Continued)

(56) References Cited

U.S. PATENT DOCUMENTS

2013/0005349 A1* 1/2013 Sanders .................... G01S 5/12 455/456.1
2019/0173642 A1* 6/2019 Zhang .................. H04L 5/0053
(Continued)

FOREIGN PATENT DOCUMENTS

EP 3791605 A1 3/2021
GB 2595871 A 12/2021
(Continued)

OTHER PUBLICATIONS

"IVAS Design Constraints (IVAS-4)", 3GPP TSG SA WG4 #121, Tdoc S4-221619, (Nov. 14-18, 2022), 20 pages.
(Continued)

*Primary Examiner* — Paras D Shah
*Assistant Examiner* — Fouzia Hye Solaiman
(74) *Attorney, Agent, or Firm* — ALSTON & BIRD LLP

(57) ABSTRACT

An apparatus comprising means for: obtaining, with respect to at least two sources within an audio scene, ordered directional metadata parameters associated with the at least two sources and identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

21 Claims, 13 Drawing Sheets

(58) Field of Classification Search

CPC ..... G10L 99/00; H04S 3/008; H04S 2400/01; H04S 2420/03; H04S 2420/07; H04S 3/004; H04S 2400/11; H04S 2420/11; H04S 7/303; H04S 2400/15; H04S 2420/01; H04S 7/302; H04R 2201/40; G01S 3/80

USPC .................................................... 381/23, 303

See application file for complete search history.

(56) References Cited

U.S. PATENT DOCUMENTS

| | | | |
|---|---|---|---|
| 2020/0120438 A1 | 4/2020 | Kim et al. | |
| 2020/0251123 A1* | 8/2020 | Fuchs | G10L 21/0232 |
| 2020/0265851 A1* | 8/2020 | Fuchs | H03M 7/6011 |
| 2020/0288262 A1* | 9/2020 | Eronen | G10L 25/48 |
| 2020/0357421 A1* | 11/2020 | Fuchs | G10L 19/18 |
| 2022/0028401 A1 | 1/2022 | Peters et al. | |
| 2022/0030372 A1 | 1/2022 | Sen et al. | |
| 2022/0335956 A1 | 10/2022 | Vasilache | |
| 2022/0366918 A1* | 11/2022 | Leppänen | G10L 19/032 |
| 2022/0386056 A1* | 12/2022 | Vasilache | H04S 3/008 |
| 2023/0178085 A1 | 6/2023 | Pihlajakuja et al. | |
| 2023/0335143 A1 | 10/2023 | Pihlajakuja et al. | |
| 2024/0029745 A1 | 1/2024 | Pihlajakuja et al. | |

FOREIGN PATENT DOCUMENTS

| | | | |
|---|---|---|---|
| GB | 2598773 | A | 3/2022 |
| GB | 2598932 | A | 3/2022 |
| WO | 2019/215391 | A1 | 11/2019 |
| WO | 2021/053266 | A | 3/2021 |
| WO | 2021/130404 | A1 | 7/2021 |
| WO | 2021/130405 | A1 | 7/2021 |
| WO | 2023/066456 | A1 | 4/2023 |
| WO | 2023/105111 | A1 | 6/2023 |
| WO | 2024/199802 | A1 | 10/2024 |
| WO | 2024/199873 | A1 | 10/2024 |

OTHER PUBLICATIONS

International Search Report and Written Opinion for Patent Cooperation Treaty Application No. PCT/EP2024/055220 dated Apr. 12, 2024, 14 pages.

Kress, B., "Optical Architectures for Augmented-, Virtual-, and Mixed-Reality Headsets", SPIE, (Jan. 13, 2020), 276 pages.

Lasse et al., "TS26.253 V1.1.0 (Codec for Immersive Voice and Audio Services, Detailed Algorithmic Description incl. RTP payload format and SDP parameter definitions)", 3GPP Draft; S4-240376; Type Draft TS; IVAS_CODEC, 3rd Generation Partnership Project (3GPP), Mobile Competence Centre ; 650, Route Des Lucioles ; F-06921 Sophia-Antipolis Cedex ; France vol. 3GPP SA 4, No. Jan. 29, 2024-Feb. 2, 2024, Feb. 2, 2024, XP052559762.

Search Report for United Kingdom Application No. GB2304791.3 dated Oct. 3, 2023, 3 pages.

* cited by examiner

Figure 5

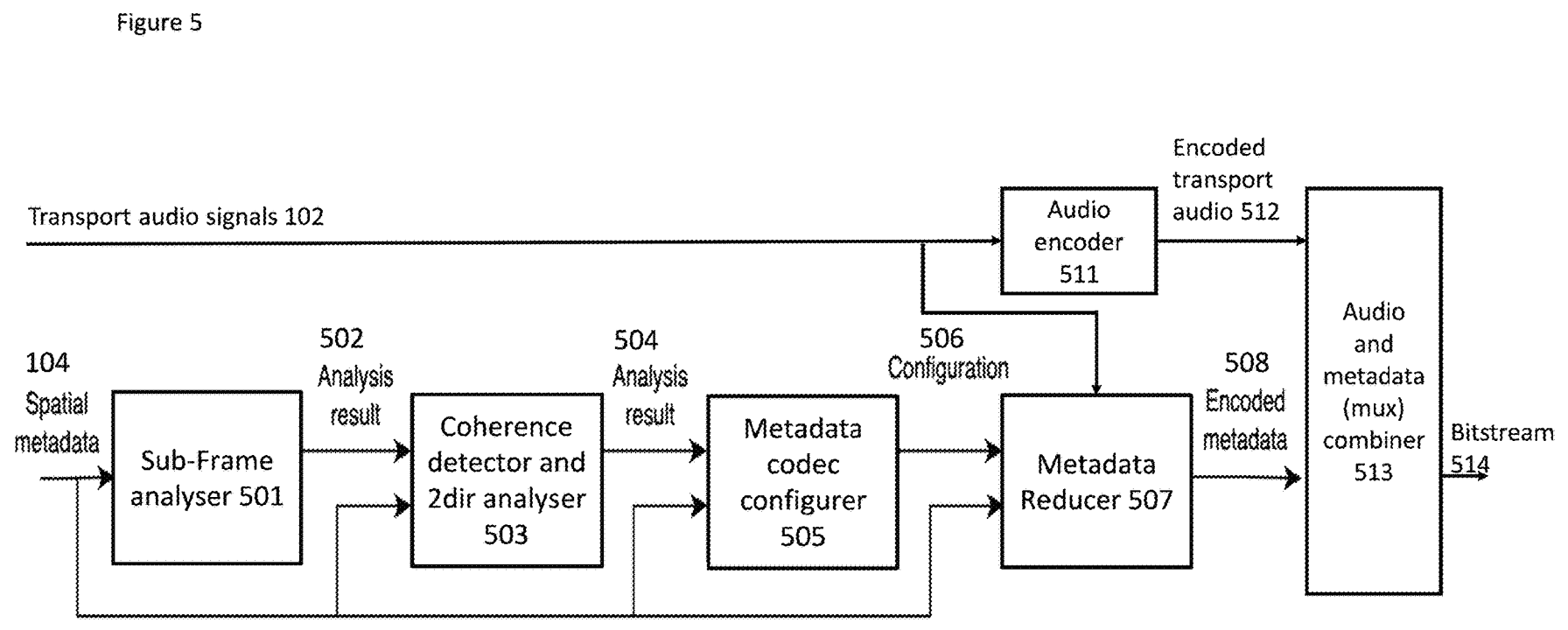

Transport audio signals 102

104 Spatial metadata

Sub-Frame analyser 501

502 Analysis result

Coherence detector and 2dir analyser 503

504 Analysis result

Metadata codec configurer 505

506 Configuration

Metadata Reducer 507

508 Encoded metadata

Audio encoder 511

Encoded transport audio 512

Audio and metadata (mux) combiner 513

Bitstream 514

710
Direction 1 parameters
720
Direction 2 parameters
Metadata frame #1
Metadata frame #2
Metadata frame #3
700
701
702
703
704
705
721
723
731
733
741
743
751
753
755
761
763
765
771
773
775
781
783
785
791
793
795

810
Direction 1 parameters
Direction 2 parameters
820
800
Metadata frame #1
802
Metadata frame #2
804
Metadata frame #3
851
853
855
861
863
865

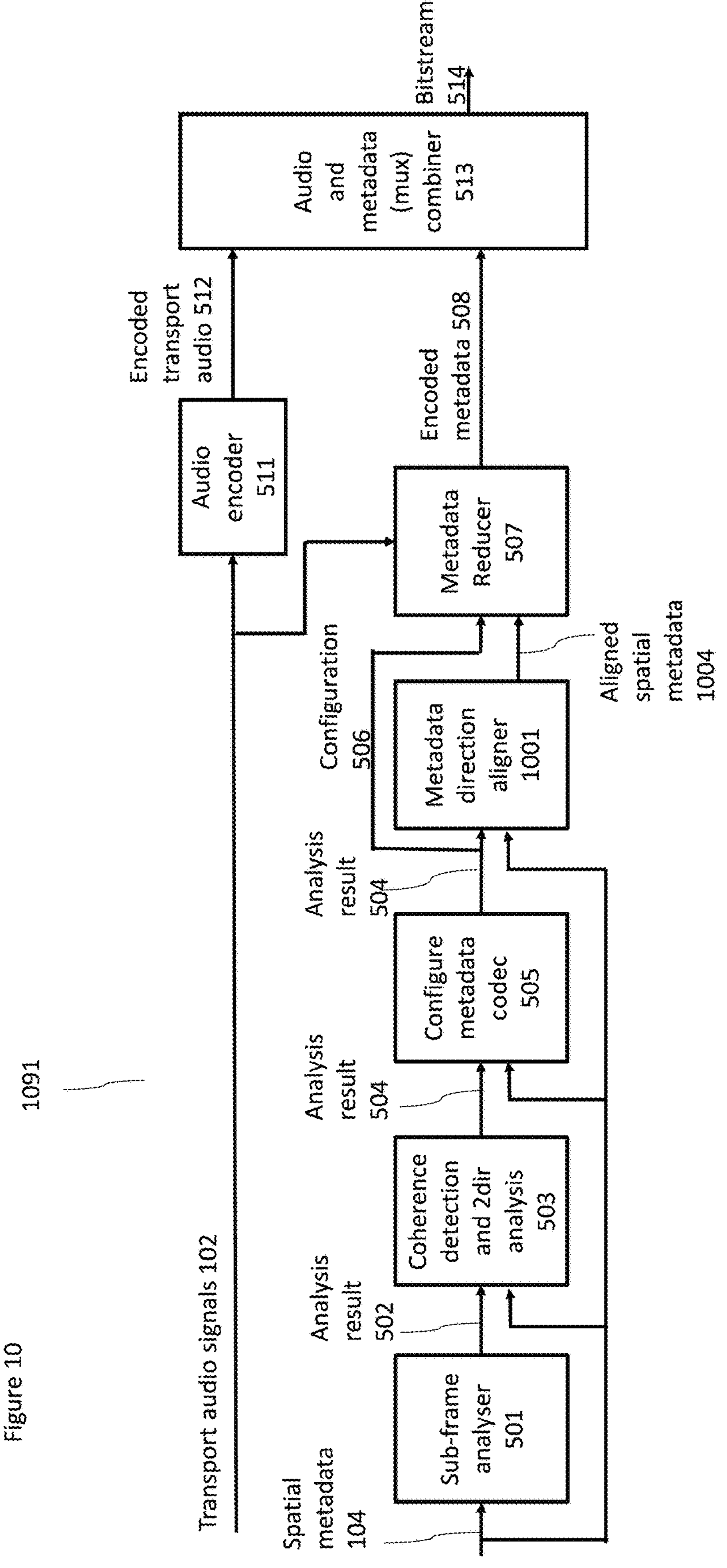

Figure 10
1091
Transport audio signals 102
Spatial metadata 104
Sub-frame analyser 501
Analysis result 502
Coherence detection and 2dir analysis 503
Analysis result 504
Configure metadata codec 505
Analysis result 504
Metadata direction aligner 1001
Configuration 506
Aligned spatial metadata 1004
Metadata Reducer 507
Encoded metadata 508
Audio encoder 511
Encoded transport audio 512
Audio and metadata (mux) combiner 513
Bitstream 514

SPATIAL METADATA DIRECTION HARMONIZATION

CROSS-REFERENCE TO RELATED APPLICATIONS

This application is a continuation of International Application No. PCT/EP2024/055220, filed Feb. 29, 2024, which claims priority to Great Britain Application No. 2304791.3, filed Mar. 31, 2023, the entire contents of which are incorporated herein by reference.

FIELD

The present application relates to apparatus and methods for spatial metadata direction harmonization.

BACKGROUND

Parametric spatial audio capture from inputs, such as microphone arrays and other sources, is a typical and an effective choice to estimate from the input (microphone array signals) a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total and diffuse-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance etc) for an audio codec. For example, these parameters can be estimated from microphone-array captured audio signals, and, for example, a stereo or mono transport audio signal can be generated from the microphone array signals to be conveyed with the spatial metadata.

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as, for example immersive voice and audio for virtual reality (VR). This audio codec is expected to handle the encoding, decoding, and rendering of speech, music and, generic audio. It is furthermore expected to support channel-based audio, object-based audio, and scene-based audio inputs including spatial information about the sound field and sound sources. The codec is also expected to operate with low latency to enable conversational services as well as support high error robustness under various transmission conditions.

The transport audio signal could be encoded, for example, using an IVAS audio core codec, or with an AAC (Advanced Audio Coding) or EVS (Enhanced Voice Services) encoder. A decoder can decode the audio signals into PCM (Pulse code modulation) signals and process the sound in frequency bands (using the spatial metadata) to obtain the spatial output, for example, a binaural output.

The aforementioned immersive audio codecs are particularly suitable for encoding captured spatial sound from microphone arrays (e.g., in mobile phones, VR cameras, stand-alone microphone arrays). However, such an encoder can have other input types, for example, loudspeaker signals, audio object signals, or Ambisonic signals.

SUMMARY

According to a first aspect there is provided an apparatus comprising means for: obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

The means for determining an ordering error with respect to at least one time-frequency tile directional metadata parameter may be for determining a similarity measure between the at least one neighbouring time-frequency tile directional metadata parameter associated with another order index and the at least one time-frequency tile directional metadata is more than, or equal to or more than a similarity measure between the at least one neighbouring time-frequency tile directional metadata parameter associated with the same order index and the at least one time-frequency tile directional metadata.

The means for determining an ordering error with respect to at least one time-frequency tile directional metadata parameter may be for determining a difference measure between the at least one neighbouring time-frequency tile directional metadata parameter associated with another order index and the at least one time-frequency tile directional metadata is less than, or equal to or less than a similarity measure between the at least one neighbouring time-frequency tile directional metadata parameter associated with the same order index and the at least one time-frequency tile directional metadata.

The at least one neighbouring time-frequency tile directional metadata parameter may be at least one of: a preceding time time-frequency tile directional metadata parameter; a succeeding time time-frequency tile directional metadata parameter; a preceding frequency time-frequency tile directional metadata parameter; a succeeding frequency time-frequency tile directional metadata parameter; a preceding time and frequency time-frequency tile directional metadata parameter; a succeeding time and frequency time-frequency tile directional metadata parameter; a preceding time and succeeding frequency time-frequency tile directional metadata parameter; and a succeeding time and preceding frequency time-frequency tile directional metadata parameter.

The means for reordering the determined at least one time-frequency tile directional metadata parameter to the another order index may be for reassigning the determined at least one time-frequency tile directional metadata parameter the another order index.

The means for reassigning the determined at least one time-frequency tile directional metadata parameter the another order index may be for: determining which of the another order index at least one neighbouring time-frequency tile directional metadata parameter is more similar and/or less different than the at least one time-frequency tile directional metadata parameter associated with the same order index; and reassigning the at least one sub-frame metadata parameter to the determined another order.

According to a second aspect there is provided a method comprising: obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

Determining an ordering error with respect to at least one time-frequency tile directional metadata parameter may comprise determining a similarity measure between the at least one neighbouring time-frequency tile directional metadata parameter associated with another order index and the at least one time-frequency tile directional metadata is more than, or equal to or more than a similarity measure between the at least one neighbouring time-frequency tile directional metadata parameter associated with the same order index and the at least one time-frequency tile directional metadata.

Determining an ordering error with respect to at least one time-frequency tile directional metadata parameter may comprise determining a difference measure between the at least one neighbouring time-frequency tile directional metadata parameter associated with another order index and the at least one time-frequency tile directional metadata is less than, or equal to or less than a similarity measure between the at least one neighbouring time-frequency tile directional metadata parameter associated with the same order index and the at least one time-frequency tile directional metadata.

The at least one neighbouring time-frequency tile directional metadata parameter may be at least one of: a preceding time time-frequency tile directional metadata parameter; a succeeding time time-frequency tile directional metadata parameter; a preceding frequency time-frequency tile directional metadata parameter; a succeeding frequency time-frequency tile directional metadata parameter; a preceding time and frequency time-frequency tile directional metadata parameter; a succeeding time and frequency time-frequency tile directional metadata parameter; a preceding time and succeeding frequency time-frequency tile directional metadata parameter; and a succeeding time and preceding frequency time-frequency tile directional metadata parameter.

Reordering the determined at least one time-frequency tile directional metadata parameter to the another order index may comprise reassigning the determined at least one time-frequency tile directional metadata parameter the another order index.

Reassigning the determined at least one time-frequency tile directional metadata parameter the another order index may comprise: determining which of the another order index at least one neighbouring time-frequency tile directional metadata parameter is more similar and/or less different than the at least one time-frequency tile directional metadata parameter associated with the same order index; and reassigning the at least one sub-frame metadata parameter to the determined another order.

According to a third aspect there is provided an apparatus comprising at least one processor and at least one memory storing instructions that, when executed by the at least one processor, cause the system at least to perform: obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

The apparatus caused to perform determining an ordering error with respect to at least one time-frequency tile directional metadata parameter may be caused to perform determining a similarity measure between the at least one neighbouring time-frequency tile directional metadata parameter associated with another order index and the at least one time-frequency tile directional metadata is more than, or equal to or more than a similarity measure between the at least one neighbouring time-frequency tile directional metadata parameter associated with the same order index and the at least one time-frequency tile directional metadata.

The apparatus caused to perform determining an ordering error with respect to at least one time-frequency tile directional metadata parameter may be further caused to perform determining a difference measure between the at least one neighbouring time-frequency tile directional metadata parameter associated with another order index and the at least one time-frequency tile directional metadata is less than, or equal to or less than a similarity measure between the at least one neighbouring time-frequency tile directional metadata parameter associated with the same order index and the at least one time-frequency tile directional metadata.

The at least one neighbouring time-frequency tile directional metadata parameter may be at least one of: a preceding time time-frequency tile directional metadata parameter; a succeeding time time-frequency tile directional metadata parameter; a preceding frequency time-frequency tile directional metadata parameter; a succeeding frequency time-frequency tile directional metadata parameter; a preceding time and frequency time-frequency tile directional metadata parameter; a succeeding time and frequency time-frequency tile directional metadata parameter; a preceding time and succeeding frequency time-frequency tile directional metadata parameter; and a succeeding time and preceding frequency time-frequency tile directional metadata parameter.

The apparatus caused to perform reordering the determined at least one time-frequency tile directional metadata parameter to the another order index may be caused to perform reassigning the determined at least one time-frequency tile directional metadata parameter the another order index.

The apparatus caused to perform reassigning the determined at least one time-frequency tile directional metadata parameter the another order index may be caused to perform: determining which of the another order index at least one neighbouring time-frequency tile directional metadata parameter is more similar and/or less different than the at least one time-frequency tile directional metadata parameter associated with the same order index; and reassigning the at least one sub-frame metadata parameter to the determined another order.

According to a fourth aspect there is provided an apparatus comprising: obtaining circuitry configured to obtain, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining circuitry configured to determine an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering circuitry configured to reorder the determined at least one time-frequency tile directional metadata parameter to the another order index.

According to a fifth aspect there is provided a computer program comprising instructions [or a computer readable medium comprising program instructions] for causing an apparatus to perform at least the following: obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

According to a sixth aspect there is provided a non-transitory computer readable medium comprising program instructions for causing an apparatus to perform at least the following: obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

According to a seventh aspect there is provided an apparatus comprising: means for obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; means for determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and means for reordering the determined at least one time-frequency tile directional metadata parameter to the another order index.

According to an eighth aspect there is provided a computer readable medium comprising program instructions for causing an apparatus to perform at least the following: obtaining, with respect to at least two sources within an audio scene, ordered directional metadata parameters, the ordered directional metadata parameters associated with the at least two sources, the directional metadata parameters identifying a direction-of-arrival with respect to the at least two sources and arranged in frames arranged as a grid of time-frequency tiles with respect to a time-axis and a frequency axis; determining an ordering error with respect to at least one time-frequency tile directional metadata parameter, the ordering error configured to identify that at least one neighbouring time-frequency tile directional metadata parameter associated with another order index is more similar and/or less different with respect to the at least one time-frequency tile directional metadata parameter than the at least one neighbouring time-frequency tile directional metadata parameter associated with the same order index; and reordering the determined at least one time-frequency tile directional metadata parameter to the another order index.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 5 shows schematically a known metadata analyser, metadata and audio encoders;

FIGS. 9 and 10 show schematically example metadata analyser, metadata and audio encoders according to some embodiments;

EMBODIMENTS OF THE APPLICATION

The following describes in further detail suitable apparatus and possible mechanisms for the encoding of parametric spatial audio signals comprising transport audio signals and spatial metadata. As indicated above immersive audio codecs (such as 3GPP IVAS) are being planned which support a multitude of operating points ranging from a low bit rate operation to transparency.

Metadata-Assisted Spatial Audio (MASA) is an example of a parametric spatial audio format and representation suitable as an input format for IVAS.

It can be considered an audio representation consisting of 'N channels+spatial metadata'. It is a scene-based audio format particularly suited for spatial audio capture on practical devices, such as smartphones. The idea is to describe the sound scene in terms of time- and frequency-varying sound source directions and, e.g., energy ratios. Sound energy in the scene that is not defined (described) by the directions, is described as diffuse (coming from all directions).

As discussed above spatial metadata associated with the audio signals may comprise multiple parameters (such as multiple directions and associated with each direction (or directional value) a direct-to-total energy ratio, spread coherence, distance, etc.) per time-frequency tile. The spatial metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example, a reasonable design choice which is able to produce a good quality output is one where the spatial metadata comprises one or more directions for each time-frequency subframe (and associated with each direction direct-to-total ratios, spread coherence, distance values etc) are determined.

Figure 1:
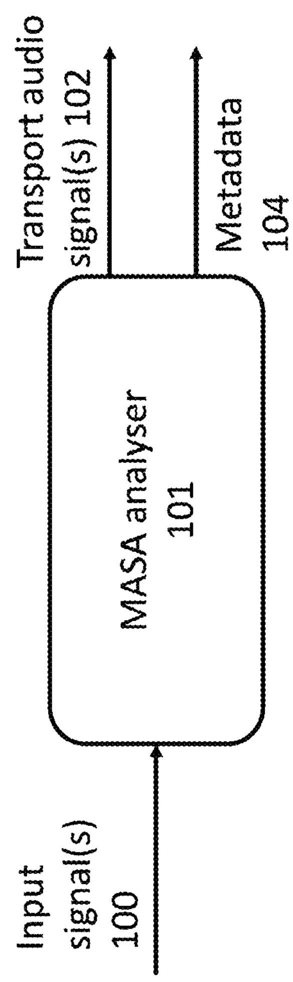
FIG. 1 shows schematically an apparatus for MASA metadata extraction.

With respect to FIG. 1 is shown an example MASA analyser 101. The MASA analyser 101 is configured to receive the input audio signal(s) 100 and analyse the input audio signals to generate transport audio signal(s) 102 and spatial metadata 104.

Examples of MASA spatial metadata is presented in the following table. These values are available for each time-frequency tile (TF-tile). In other words, the metadata is arranged as a frame comprising a number of TF-tiles or time-frequency elements which can be arranged in a 'grid' of TF-tiles or TF-elements, the grid arranged in time-axis and frequency-axis. In some implementations a frame is subdivided into 24 frequency bands and 4 temporal sub-frames. In other implementations other divisions of frequency and time can be employed. Furthermore, in some implementations a frame size (for example, as implemented in IVAS) is 20 ms (and thus the temporal sub-frame is 5 ms). However, similarly, other frame lengths can be employed in other embodiments. In some embodiments the MASA analyser is configured to determine 1 or 2 directions for each time-frequency tile (i.e., there are 1 or 2 direction index, direct-to-total energy ratio, and spread coherence parameters for each time-frequency tile). However, in some embodiments the analyser is configured to generate more than 2 directions for a time-frequency tile.

| Field | bits | Description |
|---|---|---|
| Direction index | 16 | Direction of arrival of the sound at a time-frequency parameter interval. Spherical representation at about 1-degree accuracy.<br>Range of values: "covers all directions at about 1° accuracy"<br>Values stored as 16-bit unsigned integers. |
| Direct-to-total energy ratio | 8 | Energy ratio for the direction index (i.e., time-frequency subframe).<br>Calculated as energy in direction/total energy.<br>Range of values: [0.0, 1.0]<br>Values stored as 8-bit unsigned integers with uniform spacing of mapped values. |
| Spread coherence | 8 | Spread of energy for the direction index (i.e., time-frequency subframe).<br>Defines the direction to be reproduced as a point source or coherently around the direction.<br>Range of values: [0.0, 1.0]<br>Values stored as 8-bit unsigned integers with uniform spacing of mapped values. |
| Diffuse-to-total energy ratio | 8 | Energy ratio of non-directional sound over surrounding directions.<br>Calculated as energy of non-directional sound/total energy.<br>Range of values: [0.0, 1.0]<br>(Parameter is independent of number of directions provided.) |

-continued

| Field | bits | Description |
|---|---|---|
| | | Values stored as 8-bit unsigned integers with uniform spacing of mapped values. |
| Surround coherence | 8 | Coherence of the non-directional sound over the surrounding directions. Range of values: [0.0, 1.0] (Parameter is independent of number of directions provided.) Values stored as 8-bit unsigned integers with uniform spacing of mapped values. |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) Values stored as 8-bit unsigned integers with uniform spacing of mapped values. |

The MASA stream can be rendered to various outputs, such as multichannel loudspeaker signals (e.g., 5.1) or binaural signals.

The direction index is an encoded form of the direction of arrival azimuth and elevation (or other direction value, for example, cartesian 2D or 3D or polar coordinate based vector) of the sound or source.

Figure 2:
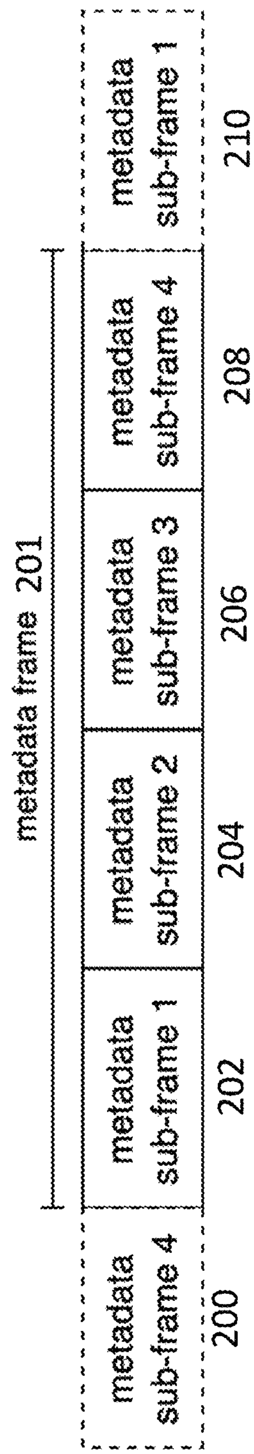
FIG. 2 shows schematically an example MASA metadata frame sub-frame structure.

As discussed above the frame size in IVAS is 20 ms. An example of the (IVAS) frame structure is shown in FIG. 2 where the metadata frame 201 comprises four temporal sub-frames which are 5 ms long. FIG. 2 shows, for example, the previous frame metadata sub-frame 4 200, then the current metadata frame 201 comprising metadata sub-frame 1 202, metadata sub-frame 2 204, metadata sub-frame 3 206, and metadata sub-frame 4 208. Following this is the succeeding or next frame metadata sub-frame 1 210.

Figure 3:
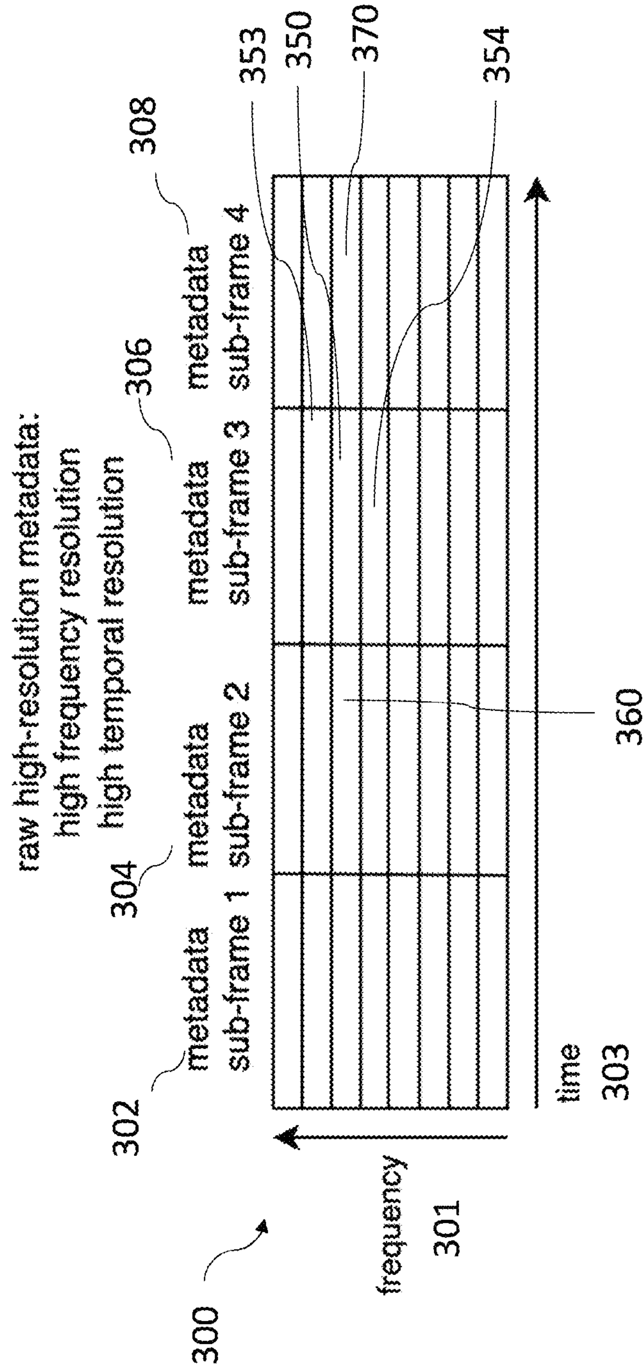
FIG. 3 shows schematically an example MASA metadata frame time-frequency structure.

Furthermore, as shown in FIG. 3, an example raw high-resolution metadata frame 300 is shown which has both high frequency and high temporal resolution. The frame 300 is shown with respect to TF-tiles which are arranged along the time 303 and the frequency axis 301. The TF-tiles are thus arranged according to on the time axis 303 with 4 sub-frames or divisions on the time axis, a metadata sub-frame 1 302, metadata sub-frame 2 304, metadata sub-frame 3 306, and metadata sub-frame 4 308. Furthermore, is shown a series of bands or divisions on the frequency axis 301 (though these are not individually labelled in FIG. 3). Thus, for a specific TF-tile 350 there can be neighbouring time TF-tiles 360, 370, or neighbouring frequency TF-tiles 353, 354.

Furthermore, the IVAS codec is expected to operate at various bit rates ranging from very low bit rates (for example, 13.2 kbps) to relatively high bit rates (for example, 512 kbps or even 768 kbps). As the raw bit rate of the MASA metadata is about 300-500 kbps (depending on whether there are encoded one or two simultaneous directions), the metadata is significantly compressed (especially at the lowest bit rates).

One aspect of compression can be methods that reduce the temporal and/or frequency resolution of the metadata (which can be employed alongside other methods for compressing the data).

For example, a metadata frame in raw high resolution can comprise 24 frequency bands on the frequency axis and 4 temporal subframes (sub-frames 1 to 4) on the time axis, meaning in total time-frequency tiles (also called TF-tiles). A known method of reducing the number of time-frequency tiles to be transmitted and therefore reduce the required bitrate significantly can be based on those described in UKIPO patent applications 1919130.3 and 1919131.1 and WO2021/130405 which present methods that allow combining metadata from multiple frequency bands and/or temporal subframes to fewer frequency bands and/or temporal subframes.

As an example, depending on the bitrate, 5-24 frequency bands and 1-4 subframes may be transmitted.

Such a method therefore comprises a metadata resolution selector configured to select and generate at least one of a 1sf, high frequency resolution (low temporal resolution) metadata frame, and a 4sf, (low frequency resolution) high temporal resolution metadata frame which can then be encoded and output.

As the MASA stream can be created from various types of devices (e.g., from microphone arrays on mobile devices as well as dedicated Ambisonics microphone arrays, such as the Eigenmike), the methods used for determining the spatial metadata may vary significantly between implementations. Some methods may have high temporal resolution but lower frequency resolution, whereas some methods may have low temporal resolution but higher frequency resolution.

In order to improve coding efficiency for both kind of time-frequency resolutions, it has been suggested that the MASA metadata could be encoded in two different modes as shown in PCT application WO2021250312. The first metadata frame resolution is the low temporal resolution (1sf) mode having only one temporal subframe mode but having a high frequency resolution, the other metadata frame resolution is the high temporal resolution (4sf) mode keeping the 4 temporal subframes but having a low frequency resolution.

In this example the low temporal resolution mode (1sf) is selected when the encoder receives spatial metadata which is determined or detected to be identical (or substantially identical or similar) over all subframes of the frame.

If the spatial metadata is not identical (or not substantially identical or not similar) over all subframes then the high temporal resolution (4sf) mode is employed.

As an example, at a certain bitrate, the low temporal resolution mode (1sf) may transmit 18 frequency bands and 1 subframe (in other words a total of 18 TF-tiles), and the high temporal resolution mode (4sf) may transmit 5 frequency bands and 4 subframes (in other words a total of 20 TF-tiles) which roughly equates to similar size of transmitted data at the same overall bit rate.

In PCT application WO2019105575, it has been proposed to use variable input metadata time-frequency resolution. This achieves a similar trade-off as methods of PCT application WO2021250312, however the decision is implemented outside of the codec and can be based on the specific capture algorithm for the microphone array being used.

The methods described above therefore show ways to permit an encoding quality to be maintained, where the temporal and the frequency resolution is tuned or adjusted with respect to the audio input.

Figure 4:
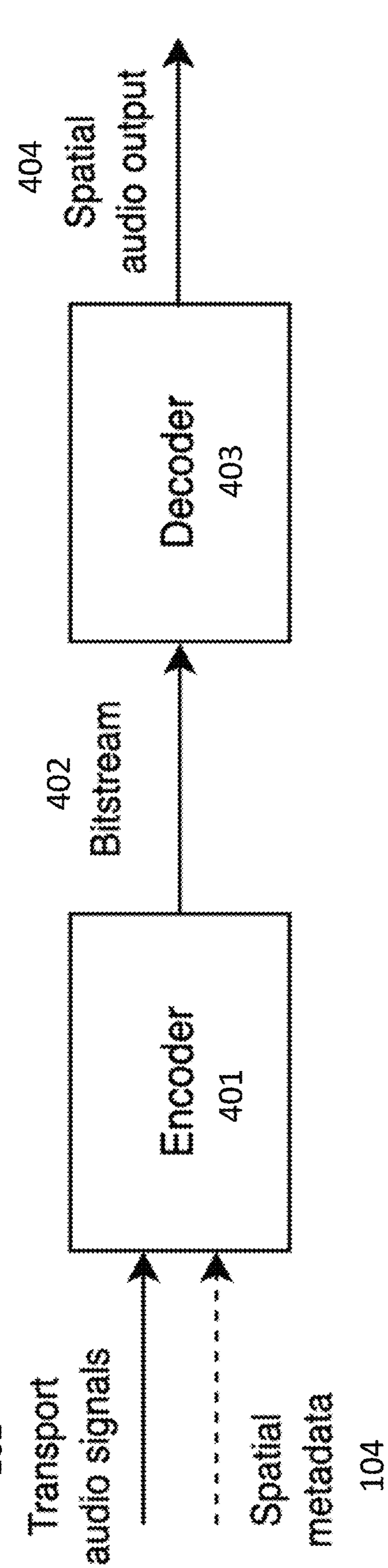
FIG. 4 shows schematically an example system of apparatus suitable for implementing some embodiments.

With respect to FIG. 4 is shown an example system within which some embodiments can be implemented. As an input are the transport audio signals 102 and the spatial metadata 104. The transport audio signals 102 and the spatial metadata 104 are passed to an encoder 401 which generates an encoded bitstream 402. The encoded bitstream 402 is received by the decoder 403 which is configured to generate a spatial audio output 404.

As discussed above the input to the system, the transport audio signals 102 and the spatial metadata 104 can be obtained in the form of a MASA stream. The MASA stream can, for example, originate from a mobile device (containing a microphone array), or as an alternative example, it may have been created by an audio server that has potentially processed a MASA stream in some way.

The encoder 401 can furthermore, in some embodiments, be an IVAS encoder.

The decoder 403, in some embodiments, can be configured to directly output the spatial audio output 404 to be rendered by an external renderer, or edited/processed by an audio server. In some embodiments, the decoder 403 comprises a suitable renderer, which is configured to render the output in a suitable form, such as binaural audio signals or multichannel loudspeaker signals (such as 5.1 or 7.1+4 channel format), which are also examples of spatial audio output 404.

The encoder 401 is shown in further detail in FIG. 5. The encoder 401 in this example comprises a spatial metadata encoder configured to operate such that when it sees 4 sub-frames with different metadata, the encoding uses a high temporal resolution 4sf, but with a low frequency resolution.

The spatial metadata encoder is configured to receive the spatial metadata 104. The spatial metadata 104 is passed to a sub-frame analyser 501 which is configured to analyse sub-frames in spatial metadata 104 to detect if all 4 sub-frames are similar and the 1sf coding mode could be used.

An example similarity test can, in some embodiments, be implemented by comparing the spatial metadata fields element-by-element, and if the difference of the value in some field is larger than a given threshold value, the spatial metadata are different. If the metadata are not different, they are similar.

For example, the following can be implemented as a similarity check:

Check the directional spatial metadata fields that are populated (1 or 2 directions are active).

Check the spatial metadata parameters in each time-frequency tile.

If the difference in the azimuth parameter is larger than a given threshold, e.g., 0.5 degrees, the metadata are different.

If the difference in the elevation parameter is larger than a given threshold, e.g., 0.5 degrees, the metadata are different.

If the difference in direct-to-total energy ratio parameters is larger than a given threshold, e.g., 0.1, the metadata are different.

If the difference in the spread coherence parameter is larger than a given threshold, e.g., 0.1, the metadata are different.

If the difference in surround coherence parameters is larger than a given threshold, e.g., 0.1, the metadata are different.

However, any suitable similarity test can be implemented. For example, direction and direct-to-total ratio can be compared using an importance measure such as presented in UKIPO patent applications 1919130.3 and 1919131.1, that is, compare direction vectors which have length of direct-to-total ratio.

This analysis result 502 and the spatial metadata 104 can be passed to a coherence detector and 2dir analyser 503 which is configured to inspect the inputs and determine the presence of meaningful coherence metadata. The coherence detector and 2dir analyser 503 furthermore can be configured to analyse the spatial metadata and determines on a per-band basis whether one or two directions should be used.

The analysis result 504 and the spatial metadata 104 can then be passed to the metadata codec configurer 505 which is used to generate configuration information 506 which can be passed to a metadata reducer (metadata encoder) 507.

The encoder further is configured to receive the transport audio signals 102 and pass these to an audio encoder 511 and also to a metadata reducer (metadata encoder) 507.

The configuration information 506, the transport audio signals 102 and the spatial metadata 104 can then be passed to the metadata reducer 507. The metadata reducer is configured to reduce the amount of metadata and generate the encoded metadata 508.

Furthermore, the encoder comprises an audio and metadata combiner (multiplexer) 513 which is configured to receive the encoded transport audio signals 512 and the encoded metadata 508 and from these generate a bitstream 514, which can be output.

In some embodiments there can be two or more direction fields present in the (MASA) spatial metadata.

Some (MASA) capture and analysis systems do not have a clear assignment between (physical sound) source directions and the metadata direction field assignment or ordering. In each parameter TF-tile, the capture may, as simplified, analyse the direction of a source with the highest energy (in a TF-tile) and assign this to the first direction field, and then analyse the dominating direction of the remaining sound field (e.g., the direction of another sound source) and assign this to the second direction field. In other situations, the capture and analysis systems may divide the space into non-overlapping regions, analyse the directions of the source in each region, and assign each region to a dedicated direction field.

When the relative level of the sound sources varies over time (and frequency), the spatial parameters related to each physical sound source may be distributed into both (or more than two other) direction fields. Example methods doing such analysis have been presented in EP application EP3791605 and UK patent application GB2114186.6.

As an example, there may be two sound sources talking at different directions simultaneously in a room. In practice, the directions related to each source may be rapidly changing over time and frequency whether they are in the first or the second direction field.

Furthermore, although the sources can be physical sources, in other words, a physical origin for the audio signals such as a talker or instrument, it would be understood that the source is not a physical source but a result of the capture or capture analysis which assigns or orders some metadata (with low energy ratio) to a direction and can in some situations represent a group of low energy ratio associated audio sources. This situation can occur when, for example, the capture analysis can be specified to generate two directions where there is no significant second physical source.

Moreover, even if the (MASA) capture and analysis system could assign a physical direction to a specific metadata direction field, this arrangement may be broken by processing of the data. For example, the (IVAS) encoder may reorder the metadata direction fields such that the one with the higher (or highest) direct-to-total energy ratio is assigned to the first position or direction field (e.g., by the encoding function ivas_qmetadata_reorder_2dir_bands( ) in an IVAS encoder). During the first encoding round this is not a problem. However, if the decoder outputs the transport audio signals and the spatial metadata (in so-called external output), and this is used as an input to a second encoder (in so-called tandem coding), the original directions in the parameter TF-tiles can be re-assigned or shuffled to the other direction from the first encoding round.

Such shuffled directional data (regardless where the shuffling occurs) may be sub-optimal for encoding algorithms for several reasons. A prominent reason is that if the bitrate does not allow transmitting spatial metadata at the full TF-resolution, the TF-grid is made coarser (to contain fewer TF-tiles) by combining TF-tiles across time and/or frequency, as described above. The combination may be performed using energy-weighted averaging or some other method. When combining, or averaging, TF-tiles containing spatial metadata from different directions the metadata is effectively smeared and any resulting decoded output will have much lower perceptual quality than could be achieved with the same bitrate if the directions were aligned.

A further coding-related drawback is that some metadata encoding systems use differential encoding to further reduce the bitrate of the encoded metadata. In such situations a first value is encoded as it is, but following values are encoded based on a difference relative to a previous value. When the changes between values are small or slow, this allows a highly efficient encoding scheme by changing the distribution of the data to encode. However, if the spatial metadata varies significantly because the shuffling of the metadata means that the fields relate to different elements (for example, a different physical directions), the differential encoding is likely to perform poorly.

For example, a (MASA) audio scene can comprise two direct sound sources with approximately constant spatial locations.

The example scene can be analyzed and determined to have two direction fields where each physical direction is assigned to one metadata direction field. In the following FIGS. 6 and 7, a solid line or box corresponds to a first of the direct sources and a dashed line or box corresponds to a second of the direct sound sources.

Figure 6:
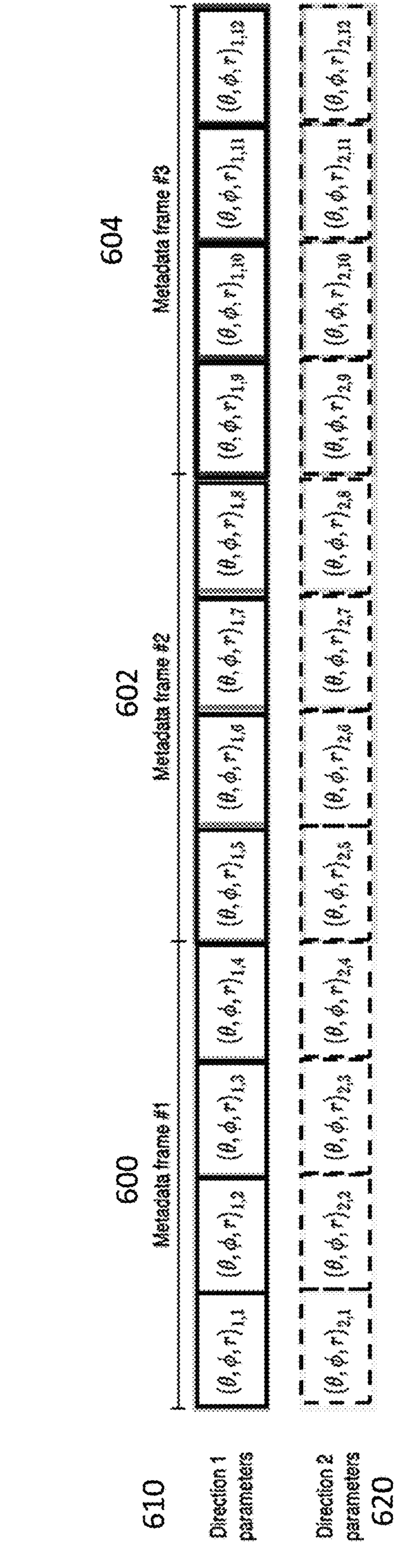
FIG. 6 shows example input data with 2 direction fields, each corresponding to one physical direction.

For example, FIG. 6 shows a series of metadata frames, frame #1 600, frame #2 602, and frame #3 604 and for a first direction 610, direction 1 parameters and a second direction 620, direction 2 parameters. The directional parameters are denoted as $(\theta, \phi, r)_{srcIdx,sfIdx}$, where θ is the source azimuth, ϕ is the source elevation, r is the source direct-to-total energy ratio, srcIdx is an index denoting the physical source index (similar to the solid/dashed visual representation), and sfIdx is the parameter sub-frame index within the parameter frame. In the following it is assumed that the sources have an approximately consistent physical location (or at least slow movement). As such this assumption can be represented as $$(\theta, \phi)_{1,sfIdx} \approx (\theta, \phi)_{1,sfIdx+1} \neq (\theta, \phi)_{2,sfIdx} \approx (\theta, \phi)_{2,sfIdx+1}.$$

Figure 7:
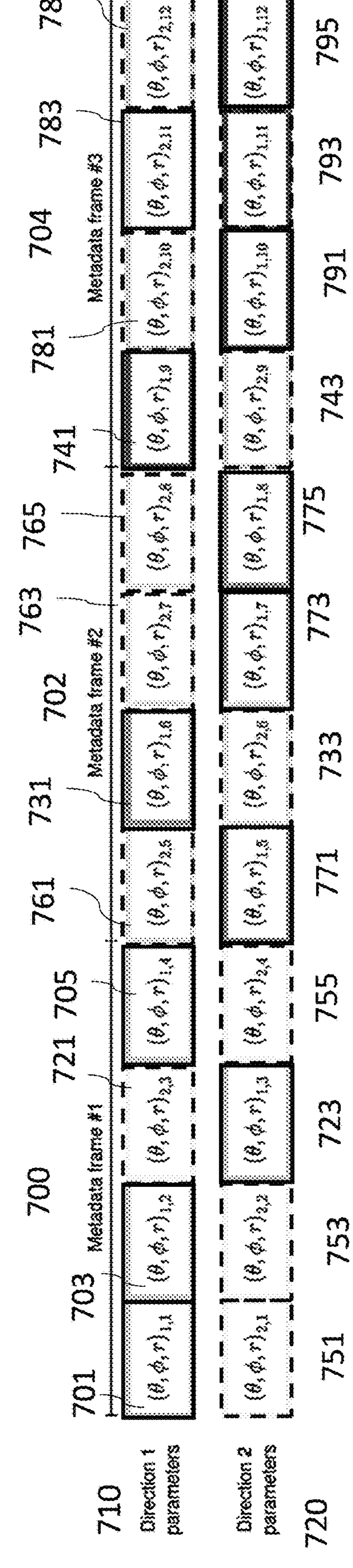
FIG. 7 shows example input data with 2 direction fields, each corresponding to one physical direction where the direction fields in sub-bands are shuffled.

Furthermore, is shown an example in FIG. 7 where, following a re-ordering of shuffling operation of the frames or sub-frames, the data in the spatial metadata direction fields may be ordered such that at least one sub-frame is shuffled between the two directions. Thus, for example, FIG. 7 shows a series of metadata frames, frame #1 700, frame #2 702, and frame #3 704. These metadata frames differ from the metadata frames shown with respect to FIG. 6 in that some of the sub-frames of the first source or direction 610, direction 1 parameters have been located in a second direction 720, direction 2 parameter field and some of the sub-frames of the second source or direction 620, direction 2 parameters have been located in a first direction 720, direction 1 parameter field.

Thus, for example, with respect to frame #1 700:

the direction 1 parameters 710 are:
- first direction first sub-frame 701;
- first direction second sub-frame 703;
- second direction third sub-frame 721; and
- first direction fourth sub-frame 705.

the direction 2 parameters 720 are:
- second direction first sub-frame 751;
- second direction second sub-frame 753;
- first direction third sub-frame 723; and
- second direction fourth sub-frame 755.

With respect to frame #2 702:

the direction 1 parameters 710 are:
- second direction fifth sub-frame 761;
- first direction sixth sub-frame 731;
- second direction seventh sub-frame 763; and
- second direction eighth sub-frame 765.

the direction 2 parameters 720 are:
- first direction fifth sub-frame 771;
- second direction sixth sub-frame 733;
- first direction seventh sub-frame 773; and
- first direction eighth sub-frame 775.

With respect to frame #3 704:

the direction 1 parameters 710 are:
- first direction ninth sub-frame 741;
- second direction tenth sub-frame 781;
- second direction eleventh sub-frame 783; and
- second direction twelfth sub-frame 785.

the direction 2 parameters 720 are:
- second direction ninth sub-frame 743;
- first direction tenth sub-frame 791;
- first direction eleventh sub-frame 793; and
- first direction twelfth sub-frame 795.

The re-ordering or shuffling process can be implemented, for example, an encoding system that assigns the direction with the larger direct-to-total energy ratio r to Direction 1. In addition, as mentioned above, some capture algorithms may not assign the directions to the direction fields based the physical directions, and the produced metadata may look directly similar to that shown in FIG. 7.

With the example (MASA) metadata and this direction-shuffled sub-frames input to an encoder, where, for example, the bitrate is relatively limited, so that the encoder may employ a low temporal resolution encoding mode (1sf mode) combining each 4 consecutive sub-frames. The result of which is a highly smeared representation of the direction parameters as illustrated below in FIG. 8.

Figure 8:
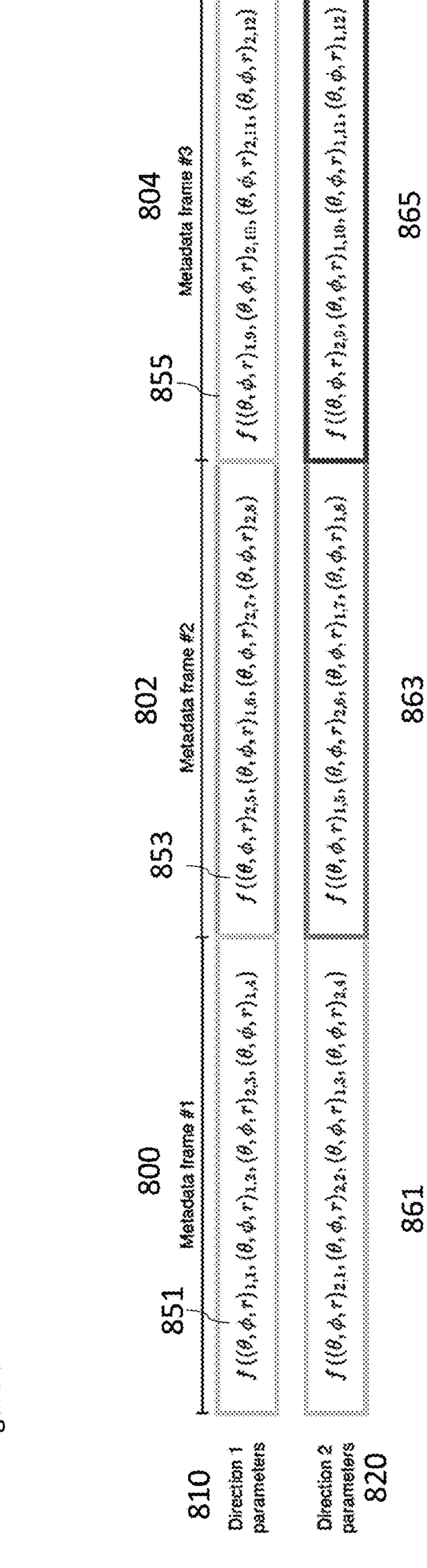
FIG. 8 shows example forcing of a low spatial resolution mode where direction blending is caused by temporal consecutive sub-frames not being consistent.

For example, FIG. 8 show a 1sf mode combination for the direction 1 parameters 810 and for the metadata frame #1 800 which is a function combination f(·) of the first direction first sub-frame 701, first direction second sub-frame 703, second direction third sub-frame 721 and first direction fourth sub-frame 705. Similarly, the direction 2 parameters 820 and for the metadata frame #1 800 is a function combination of second direction first sub-frame 751, second direction second sub-frame 753, first direction third sub-frame 723, and second direction fourth sub-frame 755.

The direction 1 parameters 810 and for the metadata frame #2 802 is a function combination of the second direction fifth sub-frame 761, first direction sixth sub-frame 731, second direction seventh sub-frame 763 and second direction eighth sub-frame 765. Similarly, the direction 2 parameters 820 and for the metadata frame #2 802 is a function combination of the first direction fifth sub-frame

771, second direction sixth sub-frame 733, first direction seventh sub-frame 773 and first direction eighth sub-frame 775.

Furthermore, the direction 1 parameters 810 and for the metadata frame #3 804 is a function combination of the first direction ninth sub-frame 741, second direction tenth sub-frame 781, second direction eleventh sub-frame 783 and second direction twelfth sub-frame 785. Similarly, the direction 2 parameters 820 and for the metadata frame #3 804 is a function combination of the second direction ninth sub-frame 743, first direction tenth sub-frame 791, first direction eleventh sub-frame 793 and first direction twelfth sub-frame 795. The function f(·) can be any suitable combination function.

As can be seen this produces 1sf frames where the resulting direction 1 parameters and direction 2 parameters are smeared as the resulting direction 1 parameter contains some of the original direction 2 values and vice versa.

This example illustrates an issue which the embodiments as discussed herein attempts to overcome when applied along the temporal axis of the data. A similar problem may occur when looking at the spatial parameters aggregated across the frequency axis and to which some embodiments can be applied in a similar manner as discussed in the following examples. This is because when the spatial metadata is encoded at a limited bitrate, the number of frequency bands is typically reduced (in the case of MASA, from 24 down to 5 at the coarsest resolution). If the bands that are combined in the encoding correspond to clearly different spatial directions, the operation of combining them may distort the resulting spatial representation.

The concept as discussed in further detail with respect to the following embodiments and examples relates to the encoding of parametric spatial audio (i.e., audio signal(s) and spatial metadata), where the spatial metadata is coded in frames and sub-frames containing two (or more) direction fields.

In these embodiments the apparatus and method is configured to pre-process the spatial metadata with respect to the direction field assignment (ordering) so that any following encoding operations retain a direction accuracy better than without pre-processing.

In some embodiments this could be implemented by:

obtaining two consecutive (sub-) frames of spatial metadata;

comparing the values of the direction fields; and determining an ordering of the metadata direction fields such that the difference between the two consecutive (sub-) frames is minimized.

In some embodiments additionally or rather than the above then this can be implemented by obtaining spatial metadata from two spatial metadata direction fields and two neighbouring bands, comparing the values of the direction fields, and determining an ordering of the metadata direction fields such that the difference between the two neighbouring bands is minimized.

There is provided, as discussed in the following embodiments, a processing step that attempts to align (or harmonize) the (MASA) metadata direction fields such that the total difference of the directions between neighbouring parameter tiles is minimized. The harmonization can be implemented in some embodiments across a time dimension as described below (and therefore usefully employed when combining multiple sub-frames of data, such as when operating in a low temporal resolution 1sf coding mode).

The harmonization furthermore be implemented, in some embodiments, across the frequency dimension (useful when lowering the frequency resolution). Furthermore, the harmonization can be implemented, in some embodiments, jointly across both time and frequency dimensions depending on the TF-tile grouping used in the encoding.

In some embodiments aligning the spatial metadata directions in TF-tiles that are grouped together tries to provide an advantage that any averaging will cause less distortion of the underlying data than in the case where the directions of the underlying data are shuffled. Additionally, aligning spatial metadata directions across the groups (or in general, across TF-domain) can have the advantage that the encoding of the data may become more efficient due to reducing any variance in the data.

Figure 9:
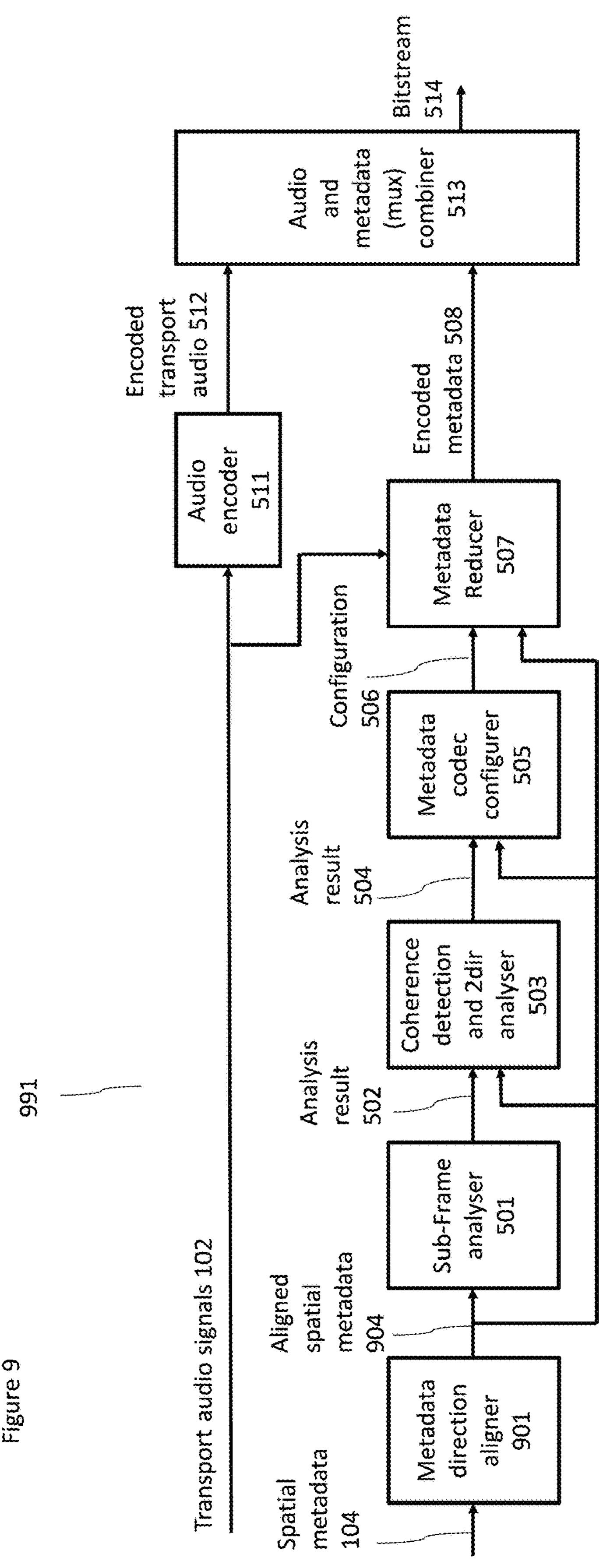

With respect to FIG. 9 is shown an example encoder based on the encoder shown in FIG. 5 but including metadata direction alignment processing of input spatial metadata and providing an aligned spatial metadata as the result for further operations.

The encoder 991 in some embodiments comprises an audio encoder 511 configured to encode the audio signals and generate an encoded transport audio signal 512.

The encoder 991 in this example is configured to receive the spatial metadata 104. The spatial metadata 104 is passed to a metadata direction aligner 901 which generates an aligned spatial metadata 904.

The encoder 991 further comprises a sub-frame analyser 501 which is configured to analyse sub-frames in the aligned spatial metadata 904 to detect if all 4 sub-frames are similar and the 1sf coding mode could be used.

This analysis result 502 and the aligned spatial metadata 904 can be passed to a coherence detector and 2dir analyser 503 which is configured to inspect the inputs and determine the presence of meaningful coherence metadata. The coherence detector and 2dir analyser 503 furthermore can be configured to analyse the spatial metadata and determines on a per-band basis whether one or two directions should be used.

The analysis result 504 and the aligned spatial metadata 904 can then be passed to the metadata codec configurer 505 which is used to generate configuration information 506 which can be passed to a metadata reducer (metadata encoder) 507.

The encoder further is configured to receive the transport audio signals 102 and pass these to an audio encoder 511 and also to a metadata reducer (metadata encoder) 507.

The configuration information 506, the transport audio signals 102 and the aligned spatial metadata 904 can then be passed to the metadata reducer 507. The metadata reducer is configured to reduce the amount of metadata and generate the encoded metadata 508.

Furthermore, the encoder comprises an audio and metadata combiner (multiplexer) 513 which is configured to receive the encoded transport audio signals 512 and the encoded metadata 508 and from these generate a bitstream 514, which can be output.

Furthermore, FIG. 10 shows a further example encoder 1091 modified from the encoder as shown in FIG. 5. In the example shown in FIG. 10 the metadata direction aligner can be located within the encoding chain or path in close vicinity of or within the metadata reducer or metadata encoder. In this configuration the metadata direction aligner is configured to receive the metadata encoding configuration as additional information and use this to determine the axis on which to operate (time axis operation across sub-frames and frames, frequency axis operation across parameter bands, or both jointly) and perform the metadata direction field harmonization on this axis.

The encoder 1091 in this example is configured to receive the spatial metadata 104. The spatial metadata 104 is passed to a sub-frame analyser 501 which is configured to analyse sub-frames in the spatial metadata 104 to detect if all 4 sub-frames are similar and the 1sf coding mode could be used.

This analysis result 502 and the spatial metadata 104 can be passed to a coherence detector and 2dir analyser 503 which is configured to inspect the inputs and determine the presence of meaningful coherence metadata. The coherence detector and 2dir analyser 503 furthermore can be configured to analyse the spatial metadata and determines on a per-band basis whether one or two directions should be used.

The analysis result 504 and the spatial metadata 104 can then be passed to the metadata codec configurer 505 which is used to generate configuration information 506 which can be passed to a metadata reducer (metadata encoder) 507 and the metadata direction aligner 1001.

The metadata direction aligner 1001 is configured to receive the configuration 506 and the spatial metadata 104 and from these generate an aligned spatial metadata 1004

The encoder further is configured to receive the transport audio signals 102 and pass these to an audio encoder 511 and also to a metadata reducer (metadata encoder) 507.

The encoder 1091 in some embodiments comprises an audio encoder 511 configured to encode the audio signals and generate an encoded transport audio signal 512.

The configuration information 506, the transport audio signals 102 and the aligned spatial metadata 1004 can then be passed to the metadata reducer 507. The metadata reducer is configured to reduce the amount of metadata and generate the encoded metadata 508.

Furthermore, the encoder comprises an audio and metadata combiner (multiplexer) 513 which is configured to receive the encoded transport audio signals 512 and the encoded metadata 508 and from these generate a bitstream 514, which can be output.

Figure 11:
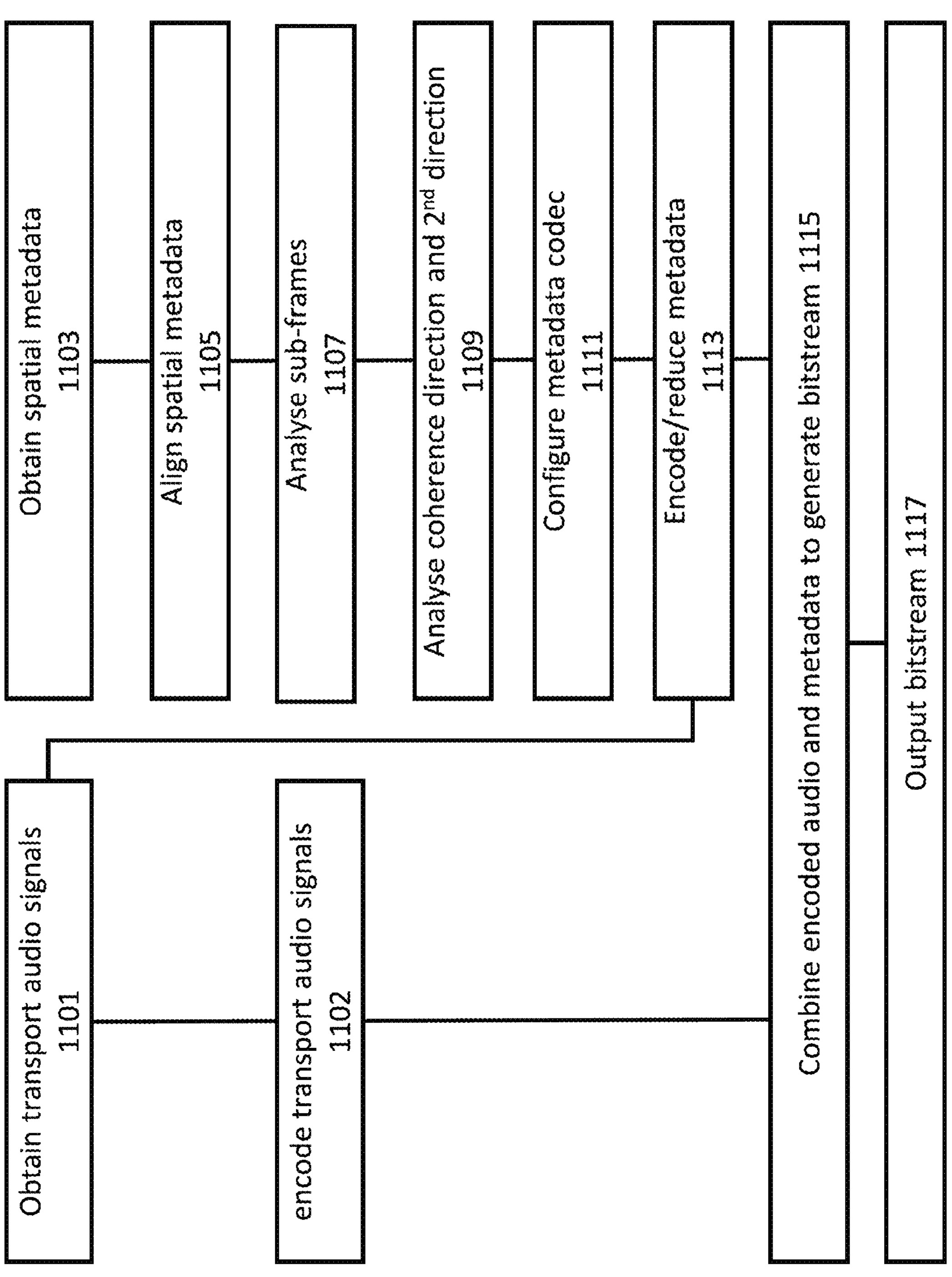
FIGS. 11 and 12 show a flow diagram of the operation of the example metadata analyser, metadata and audio encoders shown in FIGS. 9 and 10 respectively according to some embodiments.

With respect to FIG. 11 is shown an example flow diagram showing the operations of the encoder shown in FIG. 9.

Thus, as shown by 1101 is the operation of obtain transport audio signals.

The encoding of the transport audio signals is shown by 1102.

Furthermore, is shown by 1103 is the operation of obtaining the spatial metadata.

Then is the operation of aligning the spatial metadata as shown by 1105.

Following the aligning of the spatial metadata is the operation of analysing sub-frames as shown by 1107.

Then is the operation of analysing coherence direction and $2^{nd}$ direction aspects as shown by 1109.

After this is the configuration of the metadata codec as shown by 1111.

Then is the encoding/reducing of the metadata based on the configuration as shown by 1113.

Then the encoded audio and metadata can be combined to generate the bitstream as shown by 1115.

Then is the output of the bitstream as shown by 1117.

Figure 12:
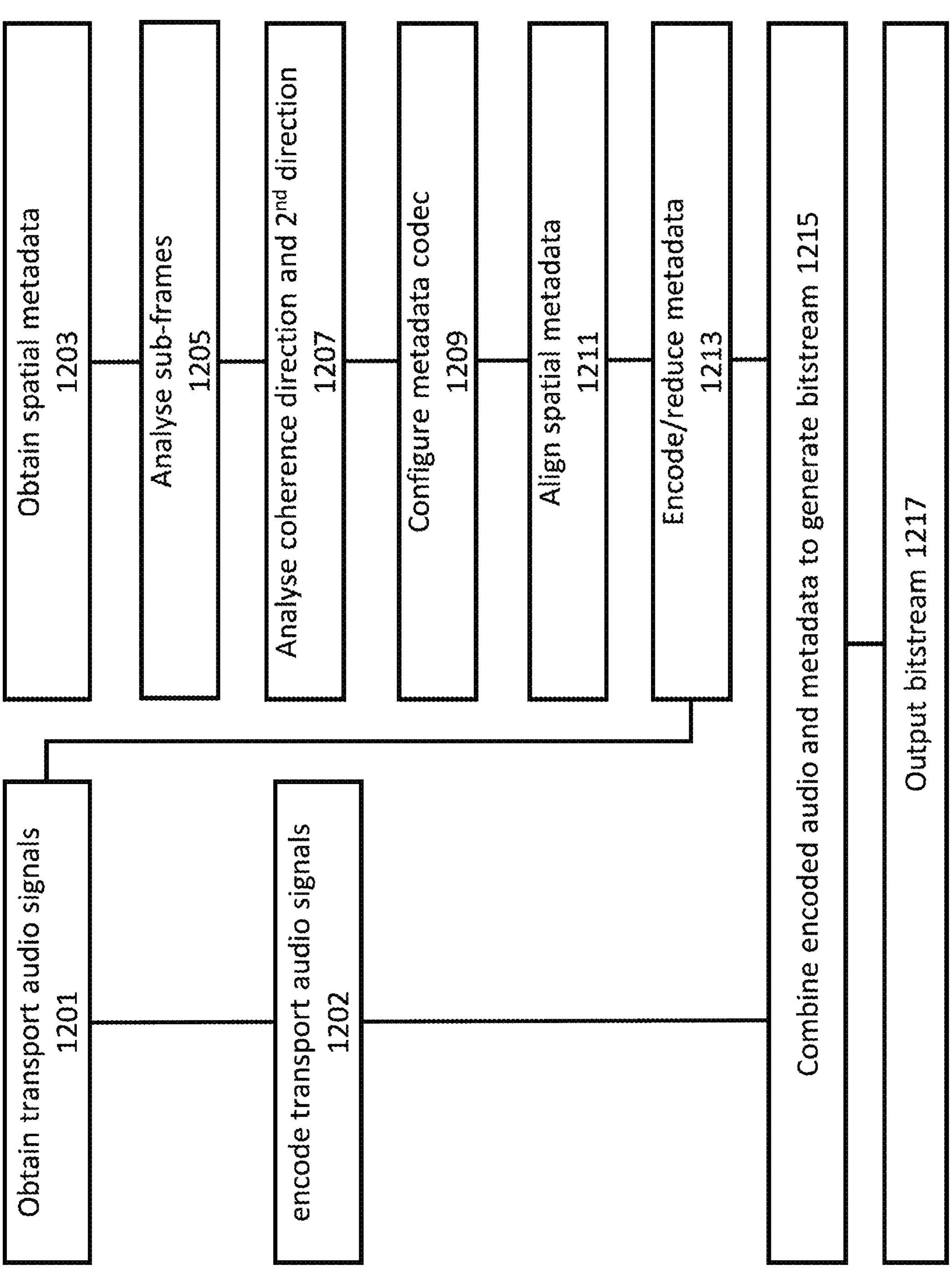

With respect to FIG. 12 is shown an example flow diagram showing the operations of the encoder shown in FIG. 10.

Thus, as shown by 1201 is the operation of obtain transport audio signals.

The encoding of the transport audio signals is shown by 1202.

Furthermore, is shown by 1203 is the operation of obtaining the spatial metadata.

Then is the operation of analysing sub-frames as shown by 1205.

Then is the operation of analysing coherence direction and $2^{nd}$ direction aspects as shown by 1207.

After this is the configuration of the metadata codec as shown by 1209.

Then is the operation of aligning the spatial metadata as shown by 1211.

Then is the encoding/reducing of the metadata based on the configuration as shown by 1213.

Then the encoded audio and metadata can be combined to generate the bitstream as shown by 1215.

Then is the output of the bitstream as shown by 1217.

The operation of the metadata direction aligner 901, 1001 can be implemented in some embodiments in the following manner:

0. Obtain or receive a given spatial metadata sub-frame with the direction information $(\theta, \phi, r)_{1,sfIdx}$ in direction field 1 and $(\theta, \phi, r)_{2,sfIdx}$ in direction field 2. This is the initialization and the output metadata sub-frame has the direction fields $$(\theta, \phi, r)^{out}_{1,sfIdx} = (\theta, \phi, r)_{1,sfIdx} \text{ and } (\theta, \phi, r)^{out}_{2,sfIdx} = (\theta, \phi, r)_{2,sfIdx}.$$

1. Obtain or receive the next spatial metadata sub-frame with the direction information $(\theta, \phi, r)_{1,sfIdx+1}$ and $(\theta, \phi, r)_{2,sfIdx+1}$.
2. Determine a total difference measure between the directions in the two sub-frames when using the direction field assignment as in the given data $$d_{keep} = D\left((\theta, \phi, r)^{out}_{1,sfIdx}, (\theta, \phi, r)_{1,sfIdx+1}\right) + D\left((\theta, \phi, r)^{out}_{2,sfIdx}, (\theta, \phi, r)_{2,sfIdx+1}\right)$$

and a total difference measure if the assignment of the two direction fields were to be reversed $$d_{swap} = D\left((\theta, \phi, r)^{out}_{1,sfIdx}, (\theta, \phi, r)_{2,sfIdx+1}\right) + D\left((\theta, \phi, r)^{out}_{2,sfIdx}, (\theta, \phi, r)_{1,sfIdx+1}\right)$$

3. Compares the two difference measures and determine if the direction field assignment in the next sub-frame should be kept or reversed:

If $d_{keep} < d_{swap}$, keep the direction field assignment with $$(\theta, \phi, r)^{out}_{1,sfIdx+1} = (\theta, \phi, r)_{1,sfIdx+1} \text{ and } (\theta, \phi, r)^{out}_{2,sfIdx+1} = (\theta, \phi, r)_{2,sfIdx+1}$$

Otherwise reverse the direction field assignment with $$(\theta, \phi, r)^{out}_{1,sfIdx+1} = (\theta, \phi, r)_{2,sfIdx+1} \text{ and } (\theta, \phi, r)^{out}_{2,sfIdx+1} = (\theta, \phi, r)_{1,sfIdx+1}$$

4. Repeat from step 1 using the current output direction field assignment $$(\theta, \phi, r)^{out}_{1,sfIdx+1}, (\theta, \phi, r)^{out}_{2,sfIdx+1}$$

as the reference.

In this example the measure is a "difference" measure, but in some embodiments a "similarity" measure can be used instead. In these embodiments the smaller-than comparison as indicated in the above step 3 would be replaced with a greater-than comparison.

Furthermore, in some embodiments in place of the smaller-than comparison a smaller-than-or-equal-to comparison can be employed (or similarly in place of greater-than comparison for a similarity measure a greater-than-or-equal-to comparison can be employed).

In some embodiments the difference measure D(·) can be defined, e.g., as an angular distance (sensitive to only on the directions):

$$D((\theta_1, \phi_1, r_1), (\theta_2, \phi_2, r_2)) = \cos^{-1}(\cos(\phi_1)\cos(\phi_2)\cos(\theta_1 - \theta_2) + \sin(\phi_1)\sin(\phi_2))$$

or Cartesian distance (also considering the radius or distance):

$$D((\theta_1, \phi_1, r_1), (\theta_2, \phi_2, r_2)) = \sqrt{r_1 r_1 + r_2 r_2 - 2 r_1 r_2(\cos(\phi_1)\cos(\phi_2)\cos(\theta_1 - \theta_2) + \sin(\phi_1)\sin(\phi_2))}$$

The Cartesian distance may be preferred in some situations as it is closer to what may happen in some embodiments in the aggregation of the parameters in sub-frame grouping. In such embodiments, the parameter set may comprise a weight determined from transport audio signal energy E and direct-to-total energy ratio r in the place of the direct-to-total energy ratio r: $\hat{r}=rE$, and the direction information is then $(\theta, \phi, \hat{r})$.

The above examples show possible measures, and in some embodiments other difference measures can be implemented. Furthermore, it would be understood that the difference measure can also be known as a distance measure (for example, the above difference measure values are determined based on a distance function).

The examples and embodiments above show two direction fields per sub-frame/frame. In some embodiments this can be extended to a higher number of simultaneous direction fields. In such embodiments rather than determining a difference/similarity measure with respect to two candidate direction fields, an evaluation of a difference/similarity measure for all candidate orderings available from the N directions is determined. For example, the following operations can be implemented.

0. Initialize the N direction fields with $(\theta, \phi, r)_{dirIdx,sfIdx}$, dirIdx∈[1, N].

1. Obtain the next spatial metadata sub-frame with the direction information $(\theta, \phi, r)_{dirIdx,sfIdx+1}$, dirIdx∈[1, N].

2. Generate candidate orderings ord, e.g., by listing all combinations of N directions.

3. Evaluate the difference measure $$d_{ord} = \sum_{dirIdx} D\left((\theta, \phi, r)^{out}_{dirIdx,sfIdx}, (\theta, \phi, r)_{ord(n),sfIdx+1}\right)$$

In these embodiments the summation is performed over all N directions. $(\theta, \phi, r)_{ord(n),sfIdx+1}$ is the directional metadata from the original direction n assigned into the candidate direction dirIdx.

4. Select the ordering minimizing the difference measure: ord=argmin$_{ord}$($d_{ord}$), and assign the output $$(\theta, \phi, r)^{out}_{dirIdx,sfIdx+1} \cdot \text{argmin}_{ord}$$

is a function that returns the ordering ord that has the smallest difference measure $d_{ord}$.

5. Repeat for the next sub-frame from step 1.

Furthermore, in some embodiments the above examples focus on MASA spatial metadata with two direction fields. A practical capture system can however also switch between analysing a single direction and two directions resulting in codec input that is not consistent based on number of directions. For example, a capture system may be configured to capture two directions, however due to spatial signal characteristics, it may find only one candidate direction, and therefore either output only a single direction for the frame or set the second direction as zero (i.e., set the direct-to-total energy ratio of that direction to zero). The latter can even occur for individual TF-tiles.

In some embodiments an energy-based averaging can deal correctly with such data (the zero-energy component will not, e.g., cause deviations for averaged direction data). In some embodiments, various implementations can track direction data consistency across sub-frames and frames without energy weighting, purely based on the direction values themselves. Thus, as part of metadata direction alignment, zero-energy directions should (in such implementations) be reset based on extrapolation (e.g., copying of previous direction data) or interpolation (e.g., averaging between previous and next direction data). This provides consistent 2dir MASA metadata also in case of original input data switching between 1dir and 2dir. This step can also be important in case of tandem coding operation, where previous quantization of zero-energy direction could have resulted in having a low-energy direction after decoding.

Similarly to above, this example can be extended for more directions than two. (Focus in on two direction fields and switching between one and two due to IVAS MASA format specification as part of IVAS design constraints (Tdoc S4-221619) and the corresponding IVAS codec implementation foreseen for IVAS candidate submission.)

In the embodiments described above the harmonization is implemented in the directions across the time dimension (over sub-frames and frames). This is useful when the following operations benefit from temporally consistent direction fields. When the encoding combines a number of frequency bands into a lower number of frequency bands (in the case of MASA, the highest resolution is 24 frequency bands and the lowest is 5 bands), it is more beneficial to harmonize the spatial metadata in the bands that will be grouped together in the following processing. The harmonization can implemented in a manner similar to the embodiments described above for harmonizing the data across time, but instead of $(\theta, \phi, r)_{dirIdx,sfIdx}$ using $(\theta, \phi, r)_{dirIdx,bandIdx}$. Here, bandIdx is an index of the frequency bands. The harmonization may be done across all 24 bands of the spatial metadata (in the case of MASA) or within each subset of bands that are grouped together in the lower frequency resolution.

In some embodiments it may be beneficial not to use a fixed frequency band for determining the alignment starting point. Instead, the embodiments may select the frequency band with the highest energy (determined, e.g., from the transport audio signals) and then apply the alignment method towards higher and lower frequencies starting from this band.

The presented embodiments determine the direction field ordering step-by-step in each sub-frame. It is possible to extend this into considering a number of consecutive sub-frames simultaneously, and determining the direction field ordering for a number of consecutive sub-frames simultaneously.

Furthermore, the embodiment such as shown in FIG. 9 describes the method as a pre-processing step which would be usually used before encoding and transmitting the metadata. However, this method can be also applied as post-processing step after decoding the metadata from a bitstream when the target is to output the metadata as part of MASA format output from the codec. This ensures that possible further codecs or renderers obtain the MASA format in similarly optimal form as the pre-processing would make it. In general, the presented method is beneficial to do for the metadata at least once in any chain of operations with the MASA format.

The presented embodiments determine the alignment using the direction information (azimuth and elevation) in the spatial metadata. This is only one possibility and other embodiments may consider (also) the other spatial metadata fields, e.g., spread coherence when determining the total difference measures for the ordering candidates of the direction fields.

Furthermore, in the above examples considers the 3-dimensional direction representation used in the spatial metadata of MASA. This is based on the azimuth (left-right angle on horizontal plane) and elevation (angle from horizontal plane) angles of the direction in a spherical coordinate system. This should be considered only as an example embodiment. All the operations are possible to be implemented using other direction parametrizations, such as azimuth and polar angle (angle from vertical plane), and in cases of 2-dimensional directions limited to only azimuths or elevations.

Furthermore, the encoders shown in FIGS. 9 and 10 show two possible locations for the processing within an encoder. It is also possible to apply the processing (alignment) in other locations within the processing chain or even in multiple locations at the same time. For example, it is possible that one instance of the processing is placed near the input of the metadata encoder, similar to FIG. 9, operating along time axis. In addition to this, there can be a second instance of the invention near the metadata encoder, similar to FIG. 10, operating along frequency axis. Also other configurations are possible.

Figure 13:
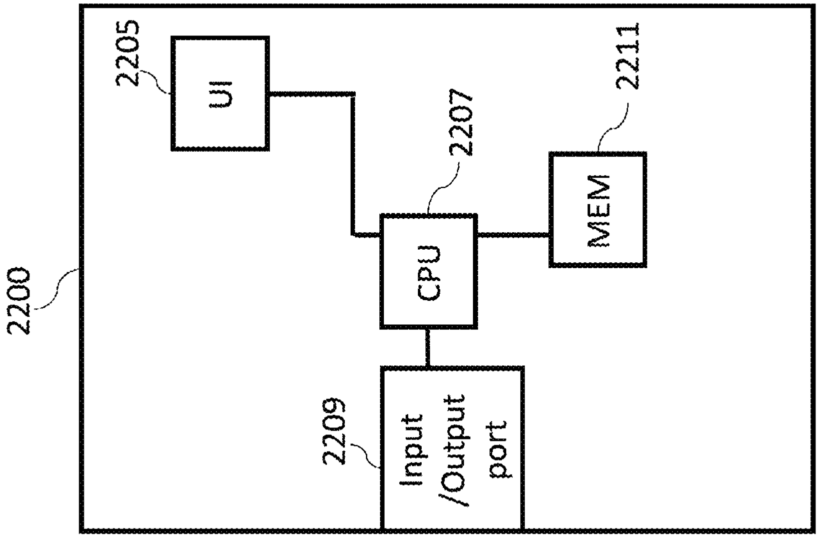
FIG. 13 shows an example device suitable for implementing the apparatus shown in previous figures.

With respect to FIG. 13 an example electronic device which may be used as any of the apparatus parts of the system as described above. The device may be any suitable electronics device or apparatus. For example, in some embodiments the device 2200 is a mobile device, user equipment, tablet computer, computer, audio playback apparatus, etc. The device may for example be configured to implement the encoder and/or decoder or any functional block as described above.

In some embodiments the device 2200 comprises at least one processor or central processing unit 2207. The processor 2207 can be configured to execute various program codes such as the methods such as described herein.

In some embodiments the device 2200 comprises at least one memory 2211. In some embodiments the at least one processor 2207 is coupled to the memory 2211. The memory 2211 can be any suitable storage means. In some embodiments the memory 2211 comprises a program code section for storing program codes implementable upon the processor 2207. Furthermore, in some embodiments the memory 2211 can further comprise a stored data section for storing data, for example data that has been processed or to be processed in accordance with the embodiments as described herein. The implemented program code stored within the program code section and the data stored within the stored data section can be retrieved by the processor 2207 whenever needed via the memory-processor coupling.

In some embodiments the device 2200 comprises a user interface 2205. The user interface 2205 can be coupled in some embodiments to the processor 2207. In some embodiments the processor 2207 can control the operation of the user interface 2205 and receive inputs from the user interface 2205. In some embodiments the user interface 2205 can enable a user to input commands to the device 2200, for example via a keypad. In some embodiments the user interface 2205 can enable the user to obtain information from the device 2200. For example, the user interface 2205 may comprise a display configured to display information from the device 2200 to the user. The user interface 2205 can in some embodiments comprise a touch screen or touch interface capable of both enabling information to be entered to the device 2200 and further displaying information to the user of the device 2200. In some embodiments the user interface 2205 may be the user interface for communicating.

In some embodiments the device 2200 comprises an input/output port 2209. The input/output port 2209 in some embodiments comprises a transceiver. The transceiver in such embodiments can be coupled to the processor 2207 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example, in some embodiments the transceiver can use a suitable radio access architecture based on long term evolution advanced (LTE Advanced, LTE-A) or new radio (NR) (or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

The transceiver input/output port 1409 may be configured to receive the signals.

In some embodiments the device 1400 may be employed as at least part of the synthesis device. The input/output port 1409 may be coupled to headphones (which may be a headtracked or a non-tracked headphones) or similar and loudspeakers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The term "non-transitory," as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory storing instructions that, when executed by the at least one processor, cause the apparatus at least to perform:

obtaining, with respect to at least two sources within an audio scene, directional metadata parameters, the directional metadata parameters associated with the at least two sources, the directional metadata parameters identifying a direction-of-arrival with respect to the at least two sources and arranged in frames arranged as a grid of time-frequency tiles with respect to a time-axis and a frequency axis, wherein each tile comprises at least two sets of ordered directional metadata parameters, one set for each of the at least two audio sources, wherein each set is associated with an order index defining an order among the at least two sets in the tile to provide the ordered directional metadata parameters;

for a first time-frequency tile and a, neighbouring, second time-frequency tile, wherein the first tile has a first set of ordered directional metadata parameter having a first order index and a second set of ordered directional metadata parameter having a second order index, wherein the second tile has a third set of ordered directional metadata parameter having the first order index and a fourth set of ordered directional metadata parameter having the second order index:

determining a first difference measure by determining a difference between the first and third sets and a difference between the second and fourth sets;

determining a second difference measure by determining a difference between the first and fourth sets and a difference between the second and third sets; and upon the first difference measure being larger than, or equal to the second difference measure, interchanging the order indexes of the first and second sets; and encoding the ordered directional metadata parameters into a bitstream to be output.

2. The apparatus of claim 1, wherein the ordered directional metadata parameters of each of the first, second, third and fourth sets comprise an azimuth parameter and an elevation parameter.

3. The apparatus of claim 2, caused to perform determining the first difference measure by:

$$\cos^{-1}(\cos(\phi_{1\_1})\cos(\phi_{2\_1})\cos(\theta_{1\_1}-\theta_{2\_1})+\sin(\phi_{1\_1})\sin(\phi_{2\_2}))+\cos^{-1}(\cos(\phi_{1\_2})\cos(\phi_{2\_2})\cos(\theta_{1\_2}-\theta_{2\_2})+\sin(\phi_{1\_2})\sin(\phi_{2\_2}))$$

and caused to perform determining the second difference measure by:

$$\cos^{-1}(\cos(\phi_{1\_1})\cos(\phi_{2\_2})\cos(\theta_{1\_1}-\theta_{2\_2})+\sin(\phi_{1\_1})\sin(\phi_{2\_2}))+\cos^{-1}(\cos(\phi_{1\_2})\cos(\phi_{2\_1})\cos(\theta_{1\_2}-\theta_{2\_1})+\sin(\phi_{1\_2})\sin(\phi_{2\_1}))$$

wherein $\phi_{1\_1}$ is the elevation parameter of the first set, wherein $\phi_{1\_2}$ is the elevation parameter of the second set, wherein $\phi_{2\_1}$ is the elevation parameter of the third set, wherein $\phi_{2\_2}$ is the elevation parameter of the fourth set, wherein $\theta_{1\_1}$ is the azimuth parameter of the first set, wherein $\theta_{1\_2}$ is the azimuth parameter of the second set, wherein $\theta_{2\_1}$ is the azimuth parameter of the third set, and wherein $\theta_{2\_2}$ is the azimuth parameter of the fourth set.

4. The apparatus of claim 1, wherein each set of the first, second, third and fourth sets is associated with a direct-to-total energy ratio and a spread coherence.

5. The apparatus of claim 1, further caused to perform, after interchanging the order indexes:

combining the ordered directional metadata parameters having the first order index in the first time-frequency tile with the ordered directional metadata parameters having the first order index in the second time-frequency tile; and combining the ordered directional metadata parameters having the second order index in the first time-frequency tile with the ordered directional metadata parameters having the second order index in the second time-frequency tile.

6. The apparatus of claim 1, wherein the neighbouring time-frequency tile is at least one of:

a preceding time time-frequency tile;

a succeeding time time-frequency tile;

a preceding frequency time-frequency tile;

a succeeding frequency time-frequency tile;

a preceding time and frequency time-frequency tile;

a succeeding time and frequency time-frequency tile;

a preceding time and succeeding frequency time-frequency tile; and a succeeding time and preceding frequency time-frequency tile.

7. The apparatus of claim 1, wherein: frames are arranged consecutively in time; the first time-frequency tile is comprised by a first frame and the neighbouring, second time-frequency tile is comprised by a second frame; and wherein either:

the first time-frequency tile is a final time-frequency tile in the first frame; the second time-frequency tile is a first time-frequency tile in the second frame; and the second frame immediately follows the first frame in time, or;

the first time-frequency tile is a first time-frequency tile in the first frame; the second time-frequency tile is a final time-frequency tile in the second frame; and the first frame immediately follows the second frame in time.

8. A method for an apparatus comprising:

obtaining, with respect to at least two sources within an audio scene, directional metadata parameters, the directional metadata parameters associated with the at least two sources, the directional metadata parameters identifying a direction-of-arrival with respect to the at least two sources and arranged in frames arranged as a grid of time-frequency tiles with respect to a time-axis and a frequency axis, wherein each tile comprises at least two sets of ordered directional metadata parameters, one set for each of the at least two audio sources, wherein each set is associated with an order index defining an order among the at least two sets in the tile to provide the ordered directional metadata parameters;

for a first time-frequency tile and a, neighbouring, second time-frequency tile, wherein the first tile has a first set of ordered directional metadata parameters having a first order index and a second set of ordered directional metadata parameters having a second order index, wherein the second tile has a third set of ordered directional metadata parameters having the first order index and a fourth set of ordered directional metadata parameters having the second order index:

determining a first difference measure by determining a difference between the first and third sets and a difference between the second and fourth sets;

determining a second difference measure by determining a difference between the first and fourth sets and a difference between the second and third sets; and upon the first difference measure being larger than, or equal to the second difference measure, interchanging the order indexes of the first and second sets; and encoding the ordered directional metadata parameters into a bitstream to be output.

9. The method of claim 8, wherein the ordered directional metadata parameters of each of the first, second, third and fourth sets comprise an azimuth parameter and an elevation parameter.

10. The method of claim 9 comprising, determining the first difference measure by:

$$\cos^{-1}(\cos(\phi_{1\_1})\cos(\phi_{2\_1})\cos(\theta_{1\_1}-\theta_{2\_1})+\sin(\phi_{1\_1})\sin(\phi_{2\_2}))+\cos^{-1}(\cos(\phi_{1\_2})\cos(\phi_{2\_2})\cos(\theta_{1\_2}-\theta_{2\_2})+\sin(\phi_{1\_2})\sin(\phi_{2\_2}))$$

and determining the second difference measure by:

$$\cos^{-1}(\cos(\phi_{1\_1})\cos(\phi_{2\_2})\cos(\theta_{1\_1}-\theta_{2\_2})+\sin(\phi_{1\_1})\sin(\phi_{2\_2}))+\cos^{-1}(\cos(\phi_{1\_2})\cos(\phi_{2\_1})\cos(\theta_{1\_2}-\theta_{2\_1})+\sin(\phi_{1\_2})\sin(\phi_{2\_1}))$$

wherein $\phi_{1\_1}$ is the elevation parameter of the first set, wherein $\phi_{1\_2}$ is the elevation parameter of the second set, wherein $\phi_{2\_1}$ is the elevation parameter of the third set, wherein $\phi_{2\_2}$ is the elevation parameter of the fourth set, wherein $\theta_{1\_1}$ is the azimuth parameter of the first set, wherein $\theta_{1\_2}$ is the azimuth parameter of the second set, wherein $\theta_{2\_1}$ is the azimuth parameter of the third set, and wherein $\theta_{2\_2}$ is the azimuth parameter of the fourth set.

11. The method of claim 8, wherein each set of the first, second, third and fourth sets is associated with a direct-to-total energy ratio and a spread coherence.

12. The method of claim 8, further comprising, after interchanging the order indexes:

combining the ordered directional metadata parameters having the first order index in the first time-frequency tile with the ordered directional metadata parameters having the first order index in the second time-frequency tile; and combining the ordered directional metadata parameters having the second order index in the first time-frequency tile with the ordered directional metadata parameters having the second order index in the second time-frequency tile.

13. The method of claim 8, wherein the neighbouring time-frequency tile is at least one of:

a preceding time time-frequency tile;

a succeeding time time-frequency tile;

a preceding frequency time-frequency tile;

a succeeding frequency time-frequency tile;

a preceding time and frequency time-frequency tile;

a succeeding time and frequency time-frequency tile;

a preceding time and succeeding frequency time-frequency tile; and a succeeding time and preceding frequency time-frequency tile.

14. The method of claim 8, wherein:

the frames are arranged consecutively in time; the first time-frequency tile is comprised by a first frame and the neighbouring, second time-frequency tile is comprised by a second frame; and wherein either:

the first time-frequency tile is a final time-frequency tile in the first frame; the second time-frequency tile is a first time-frequency tile in the second frame; and the second frame immediately follows the first frame in time, or;

the first time-frequency tile is a first time-frequency tile in the first frame; the second time-frequency tile is a final time-frequency tile in the second frame; and the first frame immediately follows the second frame in time.

15. A non-transitory computer readable medium comprising instructions which, when executed by an apparatus, cause the apparatus to perform at least the following:

obtaining, with respect to at least two sources within an audio scene, directional metadata parameters, the directional metadata parameters associated with the at least two sources, the directional metadata parameters identifying a direction-of-arrival with respect to the at least two sources and arranged in frames arranged as a grid of time-frequency tiles with respect to a time-axis and a frequency axis, wherein each tile comprises at least two sets of ordered directional metadata parameters, one set for each of the at least two audio sources, wherein each set is associated with an order index defining an order among the at least two sets in the tile to provide the ordered directional metadata parameters;

for a first time-frequency tile and a, neighbouring, second time-frequency tile, wherein the first tile has a first set of ordered directional metadata parameters having a first order index and a second set of ordered directional metadata parameters having a second order index, wherein the second tile has a third set of ordered directional metadata parameters having the first order index and a fourth set of ordered directional metadata parameters having the second order index:

determining a first difference measure by determining a difference between the first and third sets and a difference between the second and fourth sets;

determining a second difference measure by determining a difference between the first and fourth sets and a difference between the second and third sets; and upon the first difference measure being larger than, or equal to the second difference measure, interchanging the order indexes of the first and second sets; and encoding the ordered directional metadata parameters into a bitstream to be output.

16. The non-transitory computer readable medium of claim 15, wherein the ordered directional metadata parameters of each of the first, second, third and fourth sets comprises an azimuth parameter and an elevation.

17. The non-transitory computer-readable medium of claim 16, wherein the instructions when executed, further cause the apparatus to:

determine the first difference measure by:

$$\cos^{-1}(\cos(\phi_{1\_1})\cos(\phi_{2\_1})\cos(\theta_{1\_1}-\theta_{2\_1})+\sin(\phi_{1\_1})\sin(\phi_{2\_2}))+\cos^{-1}(\cos(\phi_{1\_2})\cos(\phi_{2\_2})\cos(\theta_{1\_2}-\theta_{2\_2})+\sin(\phi_{1\_2})\sin(\phi_{2\_2}))$$

and determining the second difference measure by:

$$\cos^{-1}(\cos(\phi_{1\_1})\cos(\phi_{2\_2})\cos(\theta_{1\_1}-\theta_{2\_2})+\sin(\phi_{1\_1})\sin(\phi_{2\_2}))+\cos^{-1}(\cos(\phi_{1\_2})\cos(\phi_{2\_1})\cos(\theta_{1\_2}-\theta_{2\_1})+\sin(\phi_{1\_2})\sin(\phi_{2\_1}))$$

wherein $\phi_{1\_1}$ is the elevation parameter of the first set, wherein $\phi_{1\_2}$ is the elevation parameter of the second set, wherein $\phi_{2\_1}$ is the elevation parameter of the third set, wherein $\phi_{2\_2}$ is the elevation parameter of the fourth set, wherein $\theta_{1\_1}$ is the azimuth parameter of the first set, wherein $\theta_{1\_2}$ is the azimuth parameter of the second set, wherein $\theta_{2\_1}$ is the azimuth parameter of the third set, and wherein $\theta_{2\_2}$ is the azimuth parameter of the fourth set.

18. The non-transitory computer-readable medium of claim 15, wherein each set of the first, second, third and fourth sets is associated with a direct-to-total energy ratio and a spread coherence.

19. The non-transitory computer-readable medium of claim 15, wherein the instructions when executed, further cause the apparatus to, after interchanging the order indexes:

combine the ordered directional metadata parameters having the first order index in the first time-frequency tile with the ordered directional metadata parameters having the first order index in the second time-frequency tile; and combine the ordered directional metadata parameters having the second order index in the first time-frequency tile with the ordered directional metadata parameters having the second order index in the second time-frequency tile.

20. The non-transitory computer-readable medium of claim 15, wherein the neighbouring time-frequency tile is at least one of:

a preceding time time-frequency tile;

a succeeding time time-frequency tile;

a preceding frequency time-frequency tile;

a succeeding frequency time-frequency tile;

a preceding time and frequency time-frequency tile;

a succeeding time and frequency time-frequency tile;

a preceding time and succeeding frequency time-frequency tile; and a succeeding time and preceding frequency time-frequency tile.

21. The non-transitory computer-readable medium of claim 15, wherein:

frames are arranged consecutively in time; the first time-frequency tile is comprised by a first frame and the neighbouring, second time-frequency tile is comprised by a second frame; and wherein either:

the first time-frequency tile is a final time-frequency tile in the first frame; the second time-frequency tile is a first time-frequency tile in the second frame; and the second frame immediately follows the first frame in time, or;

the first time-frequency tile is a first time-frequency tile in the first frame; the second time-frequency tile is a final time-frequency tile in the second frame; and the first frame immediately follows the second frame in time.

* * * * *